(12) United States Patent
Kanai

(10) Patent No.: US 7,046,843 B2
(45) Date of Patent: May 16, 2006

(54) CORRECTION CURVE GENERATING METHOD, IMAGE PROCESSING METHOD, IMAGE DISPLAY UNIT, AND STORAGE MEDIUM

(75) Inventor: Masashi Kanai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 551 days.

(21) Appl. No.: 09/950,923

(22) Filed: Sep. 13, 2001

(65) Prior Publication Data

US 2002/0051001 A1 May 2, 2002

(30) Foreign Application Priority Data

Sep. 13, 2000 (JP) ............................ P2000-278272

(51) Int. Cl.
*G06K 9/00* (2006.01)

(52) U.S. Cl. .................................... 382/167

(58) Field of Classification Search ........ 382/162–167; 388/518–540; 368/254–261; 345/589–595, 345/597–603, 102, 617; 348/602–603

See application file for complete search history.

(56) References Cited

U.S. PATENT DOCUMENTS

| | | | | |
|---|---|---|---|---|
| 4,974,017 A | * | 11/1990 | Terashita | 355/38 |
| 5,323,241 A | * | 6/1994 | Yonezawa | 382/167 |
| 5,371,537 A | * | 12/1994 | Bohan et al. | 348/181 |
| 5,475,493 A | * | 12/1995 | Yamana | 356/404 |
| 5,712,659 A | * | 1/1998 | Adachi | 345/617 |
| 5,757,438 A | * | 5/1998 | Yoon et al. | 348/603 |
| 5,835,465 A | * | 11/1998 | Yachida | 369/53.16 |
| 6,094,185 A | * | 7/2000 | Shirriff | 345/102 |
| 6,480,202 B1 | | 11/2002 | Deguchi et al. | |
| 6,791,565 B1 | * | 9/2004 | Kanai | 345/589 |
| 6,940,522 B1 | * | 9/2005 | Kanai | 345/600 |

FOREIGN PATENT DOCUMENTS

| | | |
|---|---|---|
| EP | 0 863 677 | 9/1998 |
| GB | 2 335 326 | 9/1999 |
| GB | 2 341 033 | 3/2000 |
| JP | 8-115067 | 5/1996 |
| JP | 10-304395 | 11/1998 |
| WO | 99/23637 | 5/1999 |

OTHER PUBLICATIONS

Patent Abstracts of Japan, Publication No. 08292752, Nov. 5, 1996.
Patent Abstracts of Japan, Publication No. 10174017, Jun. 26, 1998.

* cited by examiner

*Primary Examiner*—Jingge Wu
*Assistant Examiner*—Ishrat Sherali
(74) *Attorney, Agent, or Firm*—Lowe Hauptman & Berner, LLP

(57) ABSTRACT

In an image processing method, an image display unit, and a storage medium, capable of effecting an appropriate color reproduction even under a change in color of external illumination, a desired image processing is applied to inputted image data and thereafter the image data is displayed, an output characteristic for each component in the image display unit and color components ratios of a predetermined external illumination are measured. Then, a correction curve is generated for correcting the output characteristic so as to eliminate a difference in the measured color components ratios of the external illumination, and on the basis of the generated correction curve, an image processing is performed for the inputted image data.

13 Claims, 14 Drawing Sheets

CORRECTION CURVE GENERATING METHOD, IMAGE PROCESSING METHOD, IMAGE DISPLAY UNIT, AND STORAGE MEDIUM

BACKGROUND OF INVENTION

1. Field of Invention

The present invention relates to a correction curve generating method, an image display unit, an image processing method, and a storage medium, in which a change of a working environment is corrected to adjust the visibility output image.

2. Description of the Related Art

In case of using an image display unit such as a projector, it is important that an image intended by a producer be reproducible even if an external environment such as illumination in a room or a screen changes As such a way of thinking of adjusting the visibility of image there is shown a way of thinking called color management in which input and output characteristics of a device are managed to reproduce color. But a concrete color management method taking changes of a working environment into account has not been made clear. Particularly, as a change of environment it is necessary that the case where the color of an external illumination changes be taken into account, or else it would be difficult to make an appropriate color reproduction. For example, even in case of displaying the same white, the displayed white may look somewhat yellowish, depending on the color of an external illumination.

SUMMARY OF INVENTION

The present invention has been accomplished for solving the above-mentioned problem and it is an object of the invention to provide a correction curve generating method, an image processing method, an image display unit, and a storage medium, capable of making an appropriate color reproduction even with a change in color of an external illumination.

According to an aspect of the present invention, there is provided a method for generating a correction curve for correcting image data inputted to an image display unit, including: a measuring step of measuring color components ratios of a predetermined external illumination; and a correction curve generating step of generating a correction curve which corrects input image data so as to eliminate a difference in the measured color components ratios of the external illumination.

According to the thus constructed method for generating a correction curve for correcting image data inputted to an image display unit, color components ratios of a predetermined external illumination are measured by a measuring step of measuring. Therefore, a correction curve which corrects input image data is generated by a correction curve generating step so as to eliminate a difference in the measured color components ratios of the external illumination.

According to an aspect of the present invention, there is provided an image processing method for image data inputted to an image display unit, wherein the inputted image data is corrected by using a correction curve which eliminates a difference in color components ratios of a predetermined external illumination, and wherein the difference in color components ratios of the predetermined external illumination is eliminated by offsetting the difference.

According to an aspect of the present invention, the image processing method uses a plurality of correction curves for each of plural external illuminations different in color components ratios.

According to an aspect of the present invention, in the image processing method, the amount of the offset is determined by subtracting each color component from an average of color components.

According to an aspect of the present invention, in the image processing method, the amount of the offset is adjustable.

According to an aspect of the present invention, in the image processing method, the correction curve is subjected to a rounding process.

According to an aspect of the present invention, in the image processing method, the degree of the rounding process is adjustable.

According to an aspect of the present invention, the image processing method includes a selection step of selecting one correction curve from a plurality of generated correction curves on the basis of color components ratios of the predetermined external illumination, and an image processing is performed for input image data on the basis of the selected correction curve.

According to an aspect of the present invention, the image processing method further includes a step of inputting color components ratios of the external illumination in the selection step.

According to an aspect of the present invention, the image processing method further includes a step of measuring color components ratios of the external illumination in the selection step.

According to an aspect of the present invention, there is provided an image display unit for performing an processing for an inputted image data, wherein the inputted image data is corrected by using a correction curve which eliminates a difference in color components ratios of a predetermined external illumination, and wherein the difference in color components ratios of the predetermined external illumination is eliminated by offsetting the difference.

According to an aspect of the present invention, there is provided an image display unit for performing an image processing for an inputted image data, wherein the image display unit performs the image processing for the inputted data based on a correction curve, which is sequentially generated by sequentially repeating a method for generating the correction curve including: a measuring step of measuring color components ratios of a predetermined external illumination; and a correction curve generating step of generating a correction curve which corrects input image data so as to eliminate a difference in the measured color components ratios of the external illumination.

According to an aspect of the present invention, the image display unit uses a plurality of correction curves for each of plural external illuminations different in color components ratios.

According to an aspect of the present invention, an image display unit for performing an image processing for an inputted image data includes a storage unit for storing a plurality of correction curves, which are generated by repeating a method for generating the correction curve, with respect to each of plural external illuminations different in color components ratios, including: a measuring step of measuring color components ratios of a predetermined external illumination; and a correction curve generating step of generating a correction curve which corrects input image data so as to eliminate a difference in the measured color components ratios of the external illumination.

According to an aspect of the present invention, in the image display unit, the amount of the offset is determined by subtracting each color component from an average of color components.

According to an aspect of the present invention, in image display unit, the amount of the offset is adjustable.

According to an aspect of the present invention, in the image display unit, the correction curve is subjected to a rounding process.

According to an aspect of the present invention, in the image display unit, the degree of the rounding process is adjustable.

According to an aspect of the present invention, the image display unit includes a selection unit of selecting one correction curve from a plurality of generated correction curves on the basis of color components ratios of the predetermined external illumination, and an image processing is performed for input image data on the basis of the selected correction curve.

According to an aspect of the present invention, the image display unit further includes a unit of inputting color components ratios of the external illumination in the selection unit.

According to an aspect of the present invention, the image display unit further includes a unit of measuring color components ratios of the external illumination in the selection unit.

According to an aspect of the present invention, there is provided a computer-readable medium having a program of instructions for execution by the computer to perform an image processing for image data inputted to an image display unit, wherein the inputted image data is corrected by using a correction curve which eliminates a difference in color components ratios of a predetermined external illumination, and wherein the difference in color components ratios of the predetermined external illumination is eliminated by offsetting the difference.

According to an aspect of the present invention, the computer-readable medium includes instructions to use a plurality of correction curves for each of plural external illuminations different in color components ratios.

According to an aspect of the present invention, the computer-readable medium includes instructions to determine the amount of the offset by subtracting each color component from an average of color component.

According to an aspect of the present invention, the computer-readable medium includes instructions to make the amount of the offset adjustable.

According to an aspect of the present invention, the computer-readable medium includes instructions to subject the correction curved to a rounding process.

According to an aspect of the present invention, the computer-readable medium includes instructions to make the degree of the rounding process adjustable.

According to an aspect of the present invention, the computer-readable medium includes a selection processing of selecting one correction curve from a plurality of generated correction curves on the basis of color components ratios of the predetermined external illumination, and an image processing is performed for input image data on the basis of the selected correction curve.

According to an aspect of the present invention, the computer-readable medium further includes a processing of inputting color components ratios of the external illumination in the selection processing.

According to an aspect of the present invention, the computer-readable medium further includes a processing of measuring color components ratios of the external illumination in the selection processing.

According to an aspect of the present invention, there is provided a computer-readable medium storing a correction curve for performing an image processing for image data inputted to an image display unit, wherein the inputted image data is corrected by using a correction curve which eliminates a difference in color components ratios of a predetermined external illumination, and wherein the difference in color components ratios of the predetermined external illumination is eliminated by offsetting the difference.

According to an aspect of the present invention, the computer-readable medium includes instructions to use a plurality of correction curves for each of plural external illuminations different in color components ratios.

According to an aspect of the present inventions, the computer-readable medium includes instructions to determine the amount of the offset by subtracting each color component from an average of color components.

According to an aspect of the present invention, the computer-readable medium includes instructions to make the amount of the offset adjustable.

According to an aspect of the present invention, the computer-readable medium includes instructions to subject the correction curve to a rounding process.

According to an aspect of the present invention, the computer-readable medium includes instructions to make the degree of the rounding process adjustable.

DESCRIPTION OF THE PREFERRED EMBODIMENTS

Preferred embodiments of the present invention will be described hereinunder with reference to the drawings.

First Embodiment

System Configuration

Figure 1:
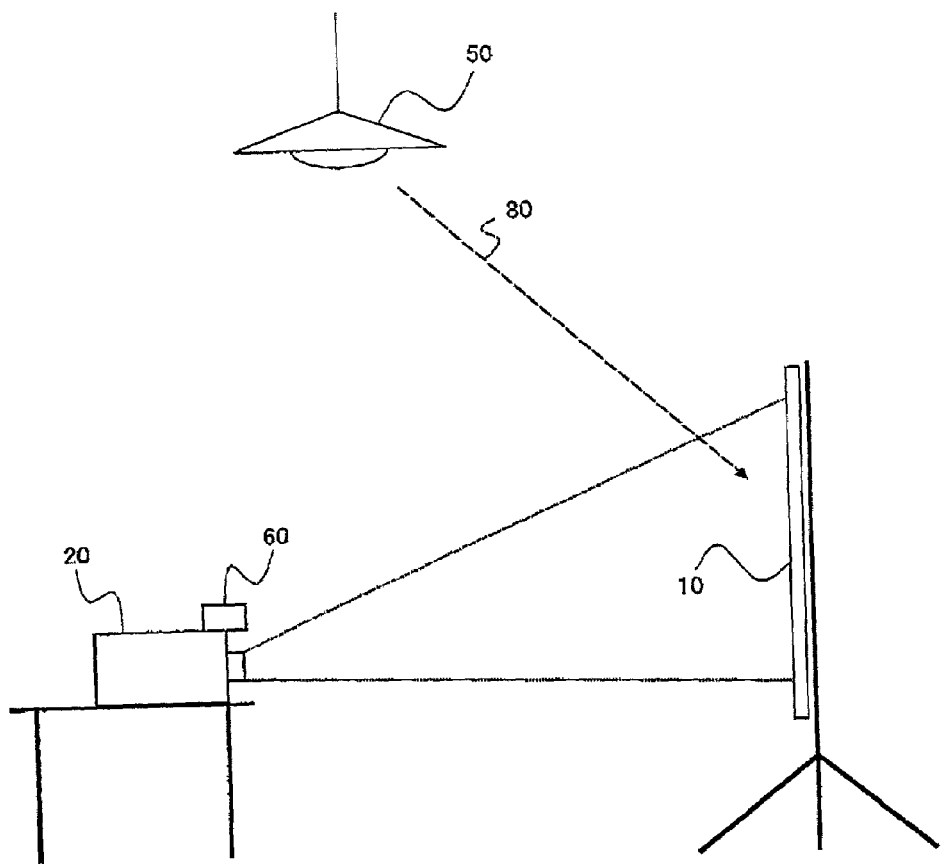
FIG. 1 is a schematic explanatory diagram of a system using a projector 20 according to an embodiment of the present invention.

FIG. 1 is a schematic explanatory diagram of a system using a projector 20 used as an image display unit according to an embodiment of the present invention. As examples of the image display unit according to the present invention there also are included a CRT and a liquid crystal display in addition to the projector.

A predetermined image is projected from the projector 20 which is disposed substantially in front of a screen 10. In this case, how an image in an image display area 12 looks different greatly in the presence of an external illumination 80 from a lighting device 50. For example, even in case of displaying the same white, the white may look somewhat yellowish, depending on the color of the external illumination 80.

Figure 2:
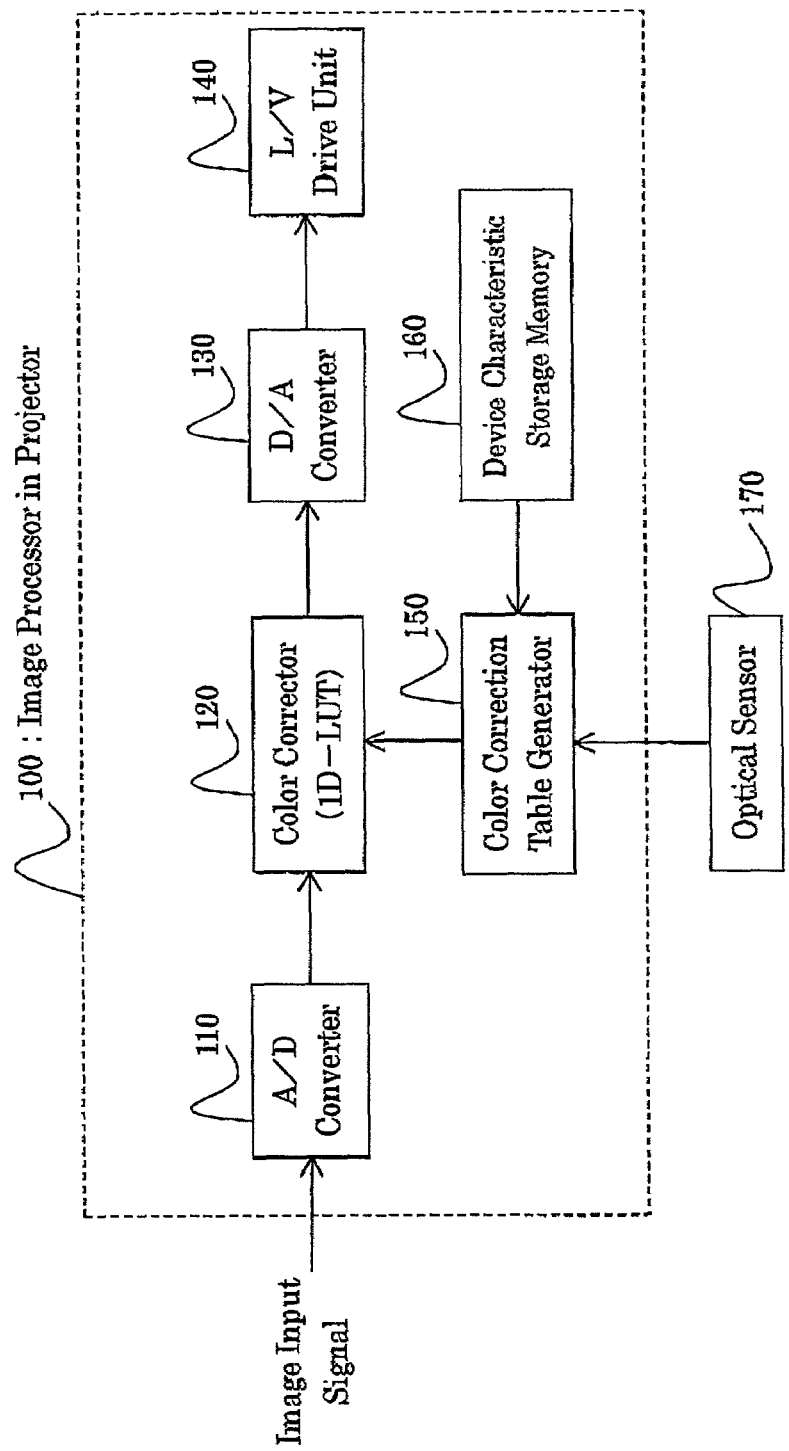
FIG. 2 is a functional block diagram of an image processor 100 used in the projector 20 of the first embodiment.

FIG. 2 is a functional block diagram of an image processor 100 installed in the projector 20 of the first embodiment.

The image processor 100 in the projector of the first embodiment is provided with an A/D converter 110 for converting an analog image input signal into a digital signal, a color corrector 120 which applies a one-dimensional color correction table to RGB image input signals to make a desired color correction, a D/A converter 130 for converting a digital signal to an analog signal, a L/V (light valve) drive unit 140 for actuating a liquid crystal light valve to make a projection display of image, a device characteristic storage memory 160 for the storage of a device (projector) characteristic, an optical sensor 170 for measuring light emitted from the projector and reflected by the screen and the external illumination reflected by the screen, and a color correction table generator 150 which generates a color correction table taking the influence of external illumination into account on the basis of both the device characteristic stored in the device characteristic storage memory 160 and a colorimetric value provided from the optical sensor 170.

In the projector according to the present invention, an analog image input signal fed from a personal computer for example is converted to a digital image signal by the A/D converter 110. Then, by the color corrector 120, a desired color correction is applied to the digital image signal thus resulting from the conversion with reference to the color correction table generated by the color correction table generator 150 and taking the influence of external illumination into account. The color-corrected digital image signal is then converted to an analog signal by the D/A converter 130. On the basis of the analog signal thus resulting from the conversion, the L/V drive unit 140 actuates a liquid crystal light valve to make a projection display of image.

Operation of the Image Processor 100

Figure 3:
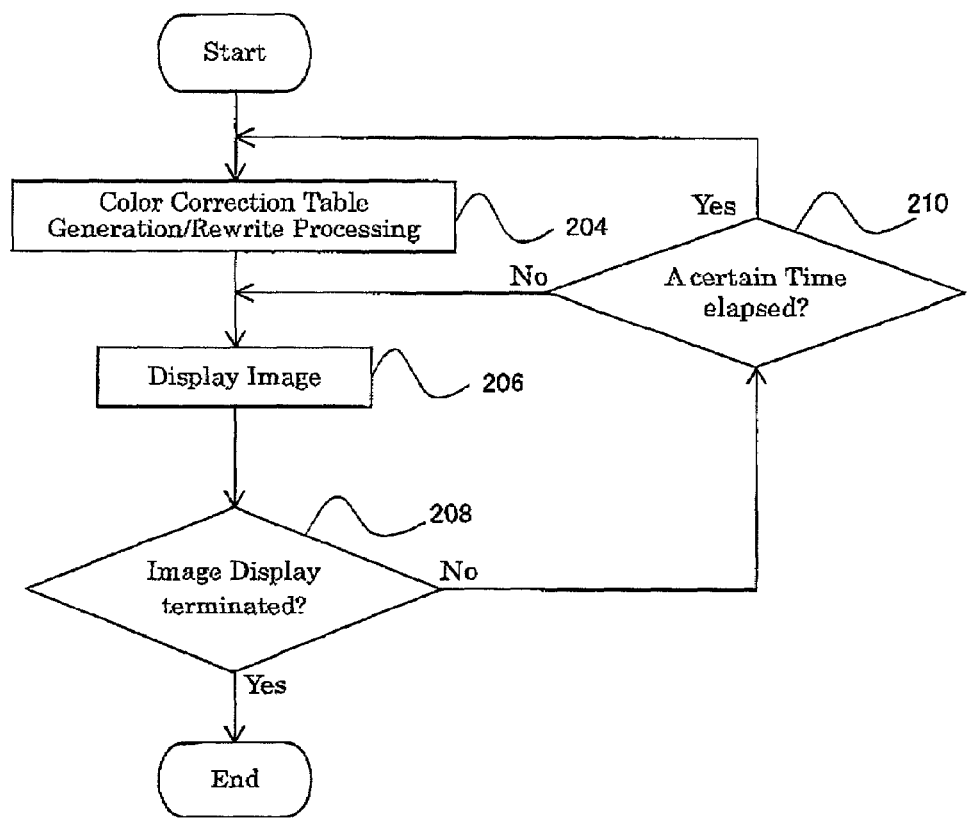
FIG. 3 is a flow chart for explaining the operation of the image processor 100 in the projector 20 of the first embodiment.

Next, the operation of the image processor 100 in the projector 20 of the first embodiment will be described below with reference to FIG. 3. Such a processing as a color correction table generation/rewrite processing by the image processor 100, which will be described below, is performed by executing an image processing program stored in a program storage unit (not shown) in the projector 20. The program storage unit constitutes a medium which stores the image processing program. The image processing program itself is included in the scope of the present invention.

First, when the use of the projector 20 according to the present invention is started, a color correction table generation/rewrite processing is performed by the color correction table generator 150 (step 204). As to the color correction table generation/rewrite processing, it will be described below in detail with reference to FIG. 4.

After the color correction table generation/rewrite processing, there is made image display with reference to the rewritten color correction table and on the basis of the image signal which has been color-corrected by the color corrector 120 (step 206). If the image display is not terminated (step 208, No) and if a certain time has not elapsed after the end of the last-time color correction table generation/rewrite processing (step 210, No), the state of image display in step 206 continues. On the other hand, if the image display is not terminated (step 208, No) and if a certain time has elapsed from the end of the last-time color correction table generation/rewrite processing (step 210, Yes), the color correction table generation/rewrite processing is again performed taking into account the case where the color of external illumination changes with the lapse of time (step 204) and there is made image display (step 206). According to the present invention, since the color correction table is rewritten at every certain time taking a change of color into account, an appropriate color reproduction is ensured even if the color of external illumination changes.

If the image display is terminated, for example by turning OFF a power supply of the projector (step 208, Yes), the processing is ended.

Color Correction Table Generation/Rewrite Processing

Figure 4:
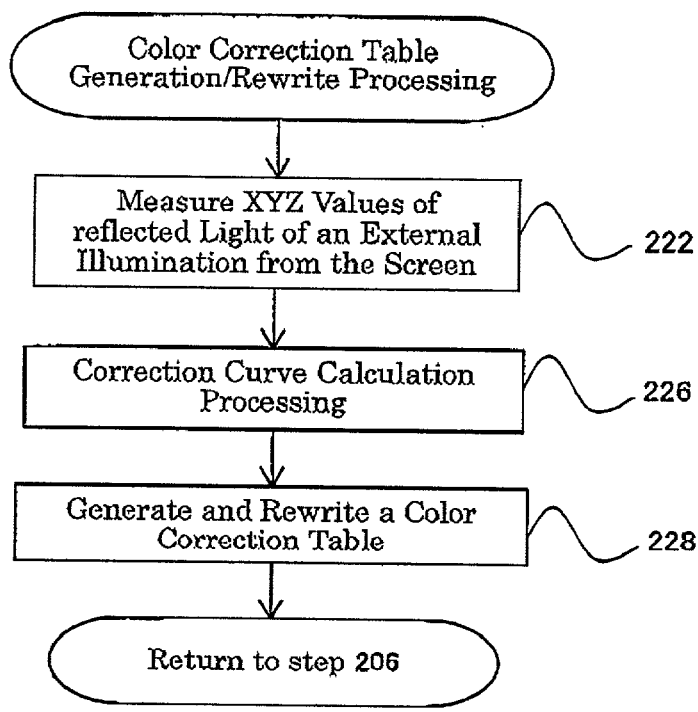
FIG. 4 is a flow chart for explaining a color correction table generation/rewrite processing executed by a color correction table generator 150 in the projector 20 of the first embodiment.

Next, with reference to FIG. 4, the following description is provided about the color correction table generation/rewrite processing (the processing of step 204 in FIG. 3) which is performed by the color correction table generator 150 in the projector 20 of the first embodiment.

In the color correction table generation/rewrite processing, R (red), G (green), B (blue), and bk (black) are outputted beforehand from the projector (image display unit) 20 in a dark surround, then XYZ values of reflected lights obtained by reflection of those color outputs from the screen are measured with an optical sensor 170 for example and are stored in the device characteristic storage memory 160.

In the absence of output from the projector 20, XYZ values of reflected light of the external illumination from the screen 10 are measured (step 222).

Next, a correction curve calculation processing is performed (step 226). As to the correction curve calculation processing, it will be described below in detail with reference to FIG. 5. On the basis of a calculated correction curve there is generated a new one-dimensional color correction curve. Then, the one-dimensional color correction table which is referenced to by the color corrector 120 is rewritten by the newly generated one-dimensional color correction table (step 228) and the processing flow returns to step 206.

Correction Curve Calculation Processing

Figure 5:
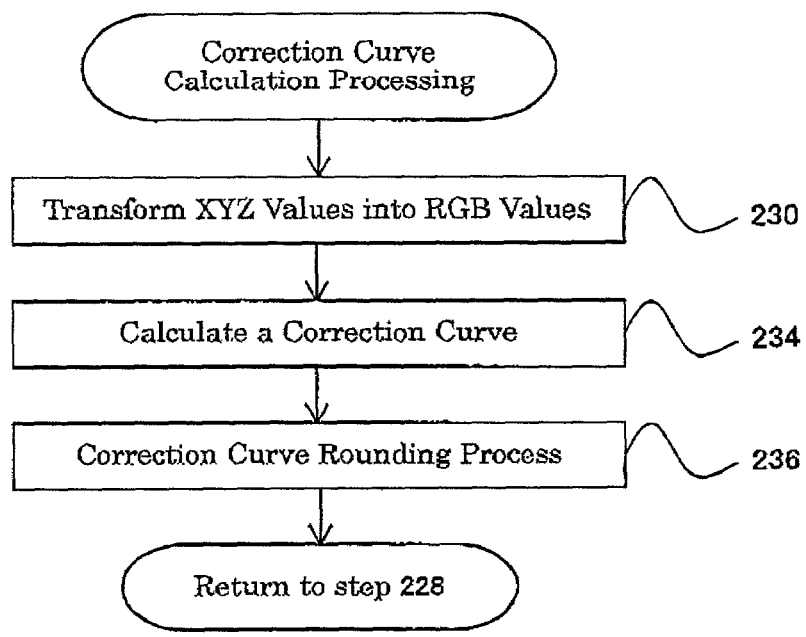
FIG. 5 is a flow chart for explaining a correction curve calculation processing executed by the color correction table generator 150 in the projector 20 of the first embodiment.

Next, with reference to FIG. 5, a description will be given about the correction curve calculation processing (the processing of step 226 in FIG. 4) which is performed by the color correction curve generator 150 in the projector 20 of this embodiment. A correction curve is determined in the following manner on the basis of the XYZ values of screen-reflected lights of R (red), G (green), B (blue), and bk (black) outputs from the projector stored in the device characteristic storage memory 160 and also on the basis of the measured values obtained in step 222 in FIG. 4.

In the correction curve calculation processing, first the XYZ values of the external illumination obtained in step 222 are transformed into RGB values of the projector (step 230). In this embodiment, for representing the color of the external illumination in terms of RGB values, a matrix M for the transformation between the projector RGB values and XYZ values is determined from the XYZ values of the colors of the projector stored in the device characteristic storage memory 160. The matrix M and transformation expressions are as follows:

$$\begin{pmatrix} X \\ Y \\ Z \end{pmatrix} = \begin{pmatrix} X_{bk} \\ Y_{bk} \\ Z_{bk} \end{pmatrix} + M \begin{pmatrix} r \\ g \\ b \end{pmatrix} \quad (1)$$

$$M = \begin{pmatrix} X_R - X_{bk} & X_G - X_{bk} & X_B - X_{bk} \\ Y_R - Y_{bk} & Y_G - Y_{bk} & Y_B - Y_{bk} \\ Z_R - Z_{bk} & Z_G - Z_{bk} & Z_B - Z_{bk} \end{pmatrix} \quad (2)$$

$$\begin{pmatrix} r \\ g \\ b \end{pmatrix} = \begin{pmatrix} D_R^\gamma \\ D_G^\gamma \\ D_B^\gamma \end{pmatrix} \quad (3)$$

In the above expressions, Xc, Yc, and Zc (c=R, G, B, bk) represent XYZ values of the colors R, G, B, and bk in the projector, $D_R$, $D_G$, and $D_B$ represent normalized values obtained by standardizing digital input values (0–255) of RGB into the range from 0 to 1, and γ represents a tone curve characteristic of the projector. As the value of γ, it is suitable to actually measure tone curve characteristic values of the projector and use a mean value thereof. In this embodiment, γ is set at 2.2 as an example.

If XYZ values of illumination are assumed to be Xi, Yi, and Zi, RGB values, $r_i$, $g_i$, and $b_i$ in case of representing the illumination color as a mixed color of RGB in the projector are as follows:

$$\begin{pmatrix} r_i \\ g_i \\ b_i \end{pmatrix} = M^{-1} \begin{pmatrix} X_i \\ Y_i \\ Z_i \end{pmatrix} \quad (4)$$

Next, a correction curve is calculated using $r_i$, $g_i$, and $b_i$ (step 234). Reproduction of a completely equal color is realized by subtracting $r_i$, $g_i$, and $b_i$ obtained in the expression (4) as offset from the RGB outputs in the projector. But this method is not a practical method because the projector gradation collapses largely.

Figure 6:
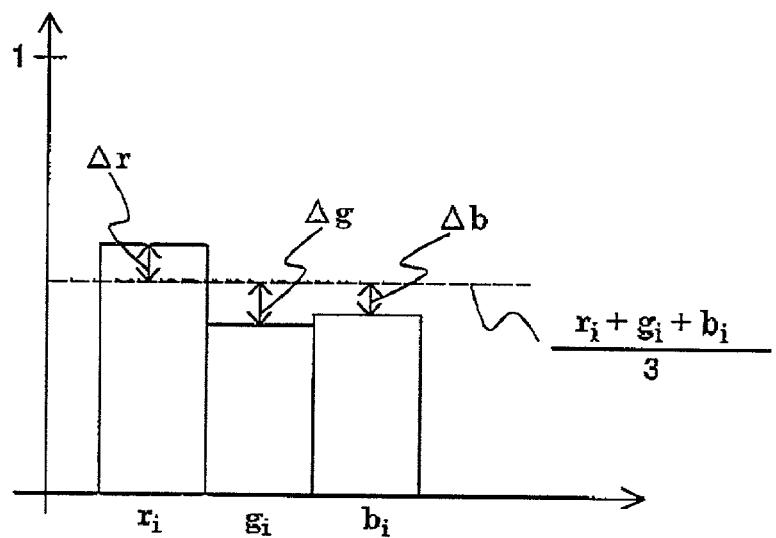
FIG. 6 is a diagram for explaining the principle of correction curve.

In view of the above point, in this embodiment there is adopted such a method as shown in FIG. 6 in which differences Δr, Δg, and Δb from a means value of $r_i$, $g_i$, and $b_i$ are subtracted as offset.

In this way it is colorimetrically possible to correct the influence of the illumination color, but in case of adjusting the amount of correction while taking into account the adaptability of the human eyes and the effect of contrast, the values of Δr, Δg, and Δb are multiplied by α (0<α<1). If 100% (α=1) correction is applied to the illumination color obtained by measurement, there is made a proper correction colorimetrically, but an unnatural image reproduction may result due to an overcorrection. The amount of correction is adjusted for eliminating this phenomenon. It is necessary that the amount of correction α be adjusted while making image evaluation actually in each environment. As the value of α, a value in the range of 0.2 to 0.5 is preferable.

The above processing is represented by the following expressions, provided only expressions of R will be given for the simplification of explanation.

$$r'(D_R) = r(D_R) - \alpha \Delta r$$

$$r(D_R) = D_R^\gamma$$

$$\Delta r = r_i - (r_i + g_i + b_i)/3$$

In the above expressions, $r(D_R)$ represents an output luminance before correction of R in the projector relative to an input value $D_R$ and $r'(D_R)$ represents an output luminance after correction.

As a result, given that an input value before correction is $D_R$in and an input value after correction is $D_R$out, a correction curve is represented as follows:

$$r(D_R out) = r'(D_R in) \quad (6)$$

$$D_R out = 0 \qquad (r'(D_R in) = 0) \quad (7)$$

$$= (D_R in^\gamma - \alpha \Delta r)^{1/\gamma} \quad (0 < r'(D_R in) < 1) \quad (8)$$

$$= 1 \qquad (r'(D_R in) = 1) \quad (9)$$

Figure 7:
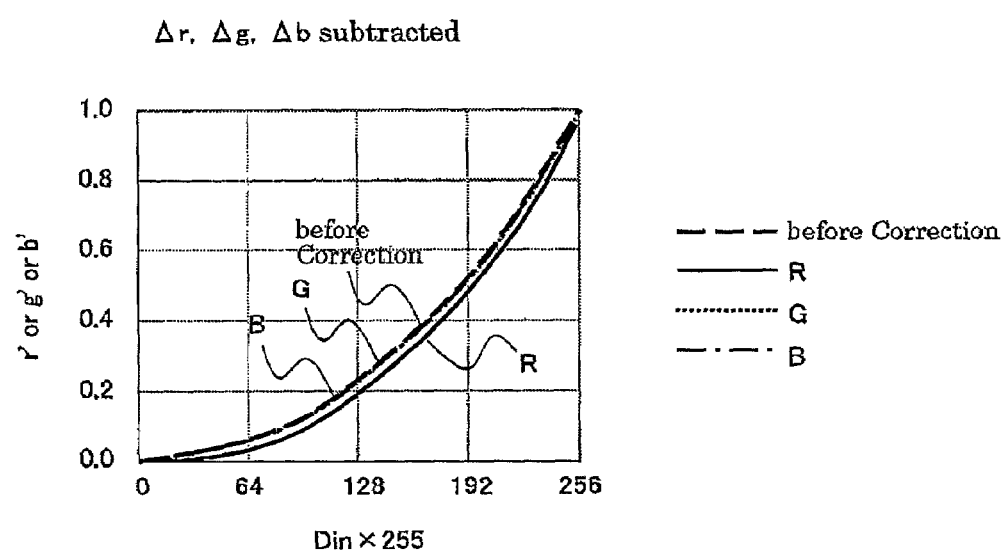
FIG. 7 is a graph showing a projector output after correction.
Figure 8:
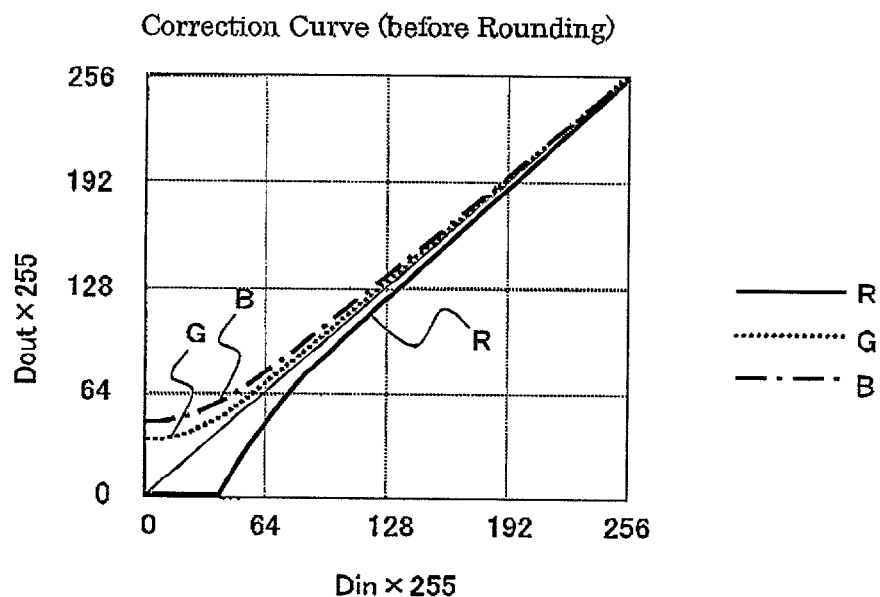
FIG. 8 is a graph showing a correction curve before a rounding process.

A graph of $r'(D_R)$, $g'(D_G)$, and $b'(D_B)$, as well as an example of correction curve ($D_R$out, $D_G$out, $D_B$out), are shown in FIGS. 7 and 8, respectively.

Next, a correction curve rounding process is executed (step 236).

The correction curve thus obtained may undergo a gradation collapse in the vicinity of a low gray scale region as shown in FIG. 8. Therefore, an excessive gradation collapse is prevented by rounding the correction curve.

1) Rounding Process for Decreasing the Amount of Correction

First, the amount of correction, ΔD=Dout−Din is decreased as follows so that there no longer is any Dout-change-free gradation:

$$\Delta D \to \Delta D - (\Delta D)^\beta \quad (Dout > Din)$$

$$\Delta D \to \Delta D + (\Delta D)^\beta \quad (Dout < Din) \quad (10)$$

With this transformation, the larger the amount of correction, the larger the decrease in the amount of correction, resulting in that the correction curve is rounded. In the above expression (10), β is a parameter indicating the intensity of the rounding process, and with β=1, the rounding process is not performed, while with β=∞, Dout=Din. A suitable value of β is about 1.5. In (1) of FIG. 9 there is shown a relation between Dout and Din in case of performing the rounding process for decreasing the amount of correction.

2) Rounding Process by Averaging in Neighborhood

Figure 9:
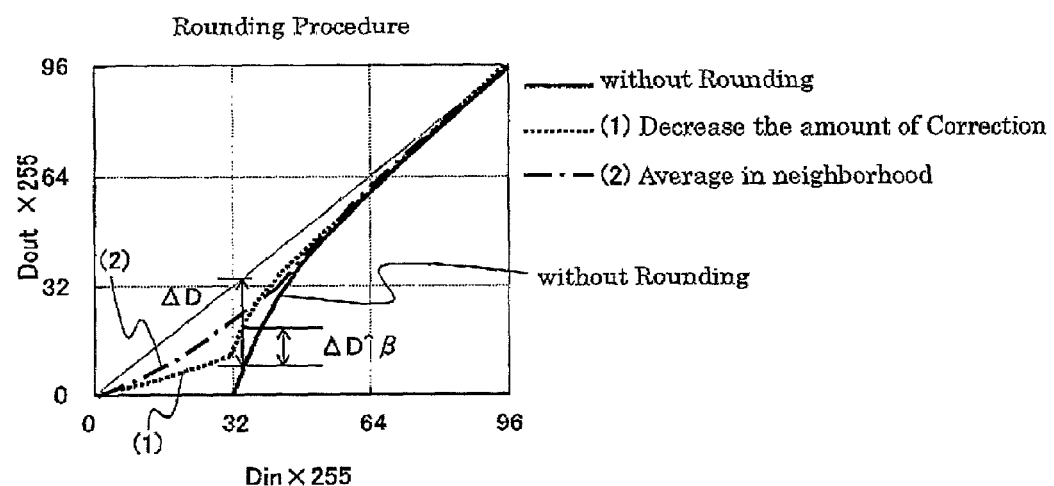
FIG. 9 is a diagram for explaining a correction curve rounding process.
Figure 10:
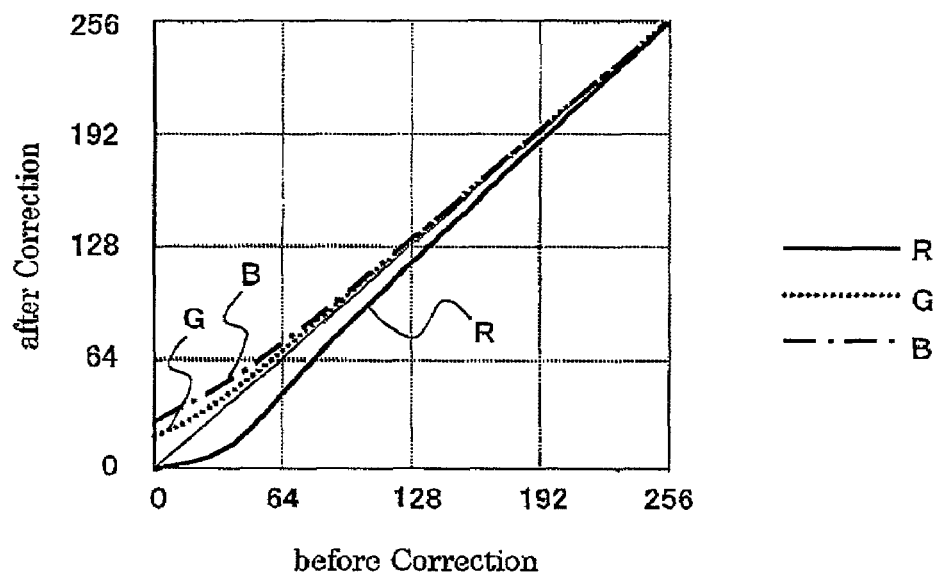
FIG. 10 is a graph showing a correction curve after the rounding process.

In the correction curve shown in (1) of FIG. 9 there remains a sharp corner, so a neighborhood mean is calculated at each of various points. More specifically, calculation is made on the assumption that there are 33 points of gradation data (Din×255=0, 8, 16, . . . , 255) and a means is taken of a total of five points which are each point plus two points on the front side and two points on the rear side of each point. By executing these processings there can be generated a correction curve free of any gray scale with Dout remaining at 0 or 1.

In the above correction curve calculation it is necessary to use four parameters which are $\gamma$ of the projector, reference point Do, correction quantity $\alpha$, and rounding process parameter $\beta$. By adjusting these values, various correction curves can be generated even by the same calculation method.

Second Embodiment

Figure 11:
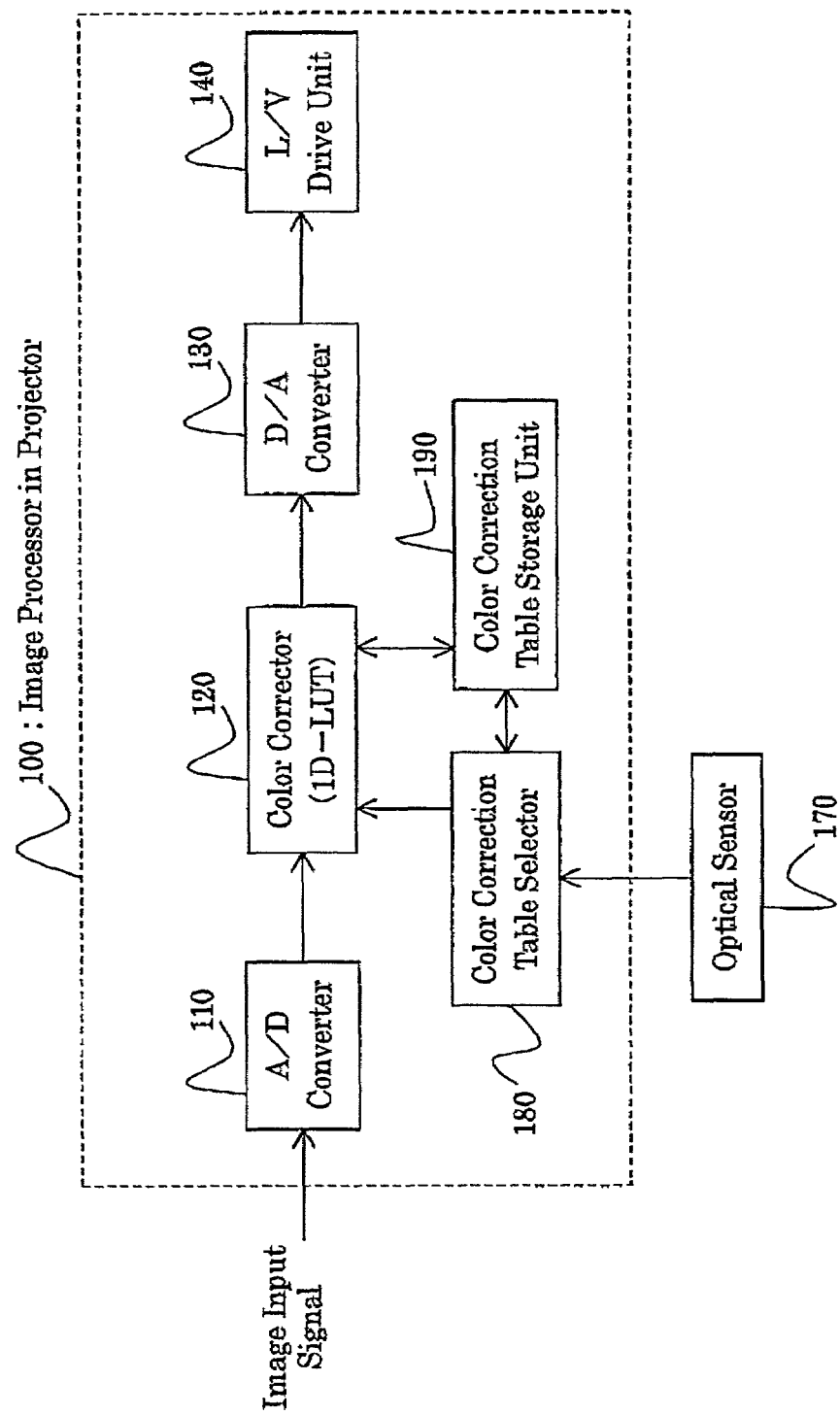
FIG. 11 is a functional block diagram of an image processor 100 used in a projector 20 according to the second embodiment of the present invention.

FIG. 11 is a functional block diagram of an image processor 100 installed in a projector 20 according to the second embodiment of the present invention, in which the same components as in the first embodiment are identified by the same reference numerals as in the first embodiment.

The image processor 100 in the projector of this second embodiment, like the first embodiment, is also provided with an A/D converter 110 for converting an analog image input signal into a digital signal, a color corrector 120 which applies a one-dimensional color correction table to RGB image input signals to make a desired color correction, a D/A converter 130 for converting a digital signal into an analog signal, and a L/V (light valve) drive unit 140 for actuating a liquid crystal light valve to make a projection display of image.

The image processor 100 in the projector of this second embodiment is further provided with a color correction table storage unit 190 for the storage of color correction tables generated for plural types of external illuminations and a color correction table selector 180 for selecting a suitable color correction table from among the color correction tables stored in the color correction table storage unit 190.

In the projector of this second embodiment, like the first embodiment, color correction tables generated are stored beforehand in the color correction table storage unit 190, and at the time of actually displaying an image, the color correction table selector 180 selects an appropriate color correction table in accordance with a colorimetric value provided from the optical sensor. On the basis of the color correction table thus selected, the color corrector 120 applies a desired color correction which takes the influence of external illumination into account to a digital image input signal. The thus color-corrected digital image input signal is converted to an analog signal by the D/A converter 130, and in accordance with the analog signal thus obtained, the L/V drive unit 140 actuates a liquid crystal light valve to make a projection display of image.

Color Correction Table Generation/Storage Processing

In the projector 20 of this second embodiment there is performed a correction curve calculation processing beforehand for plural types of external illuminations in the same way as in the first embodiment and a one-dimensional color correction table is generated on the basis of the thus-calculated correction curves. The one-dimensional color correction table thus generated and XYZ values of reflected lights obtained by the reflection of the external illuminations from the screen 10 are stored beforehand in the color correction table storage unit 190.

Operation of the Image Processor 100

Figure 12:
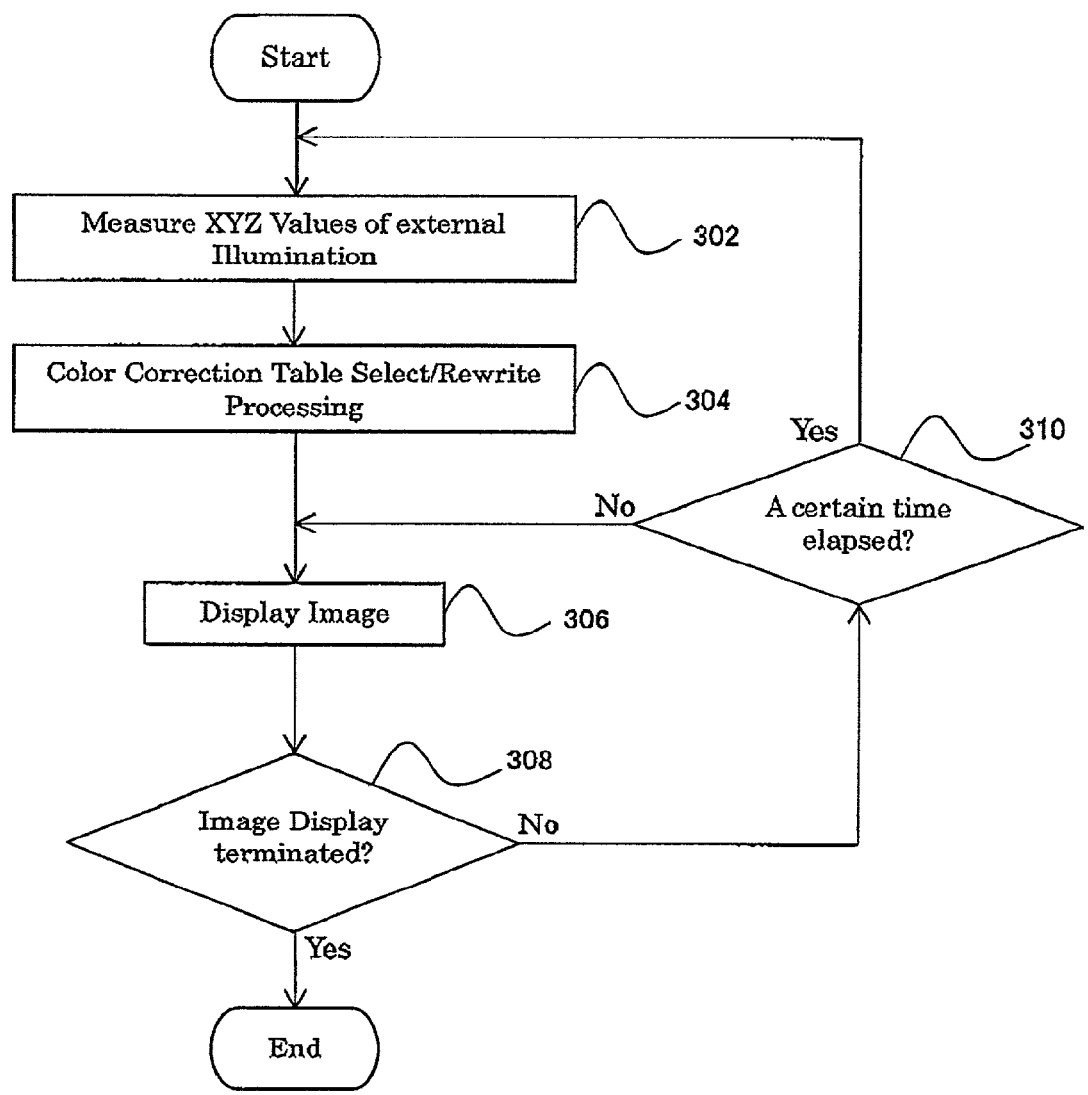
FIG. 12 is a flow chart for explaining the operation of the image processor 100 in the projector 20 of the second embodiment.

Next, with reference to FIG. 12, the following description is provided about the operation of the image processor 100 installed in the projector of this second embodiment. The processing by the image processor 100, which will be described below, is carried out by executing an image processing program stored in a program storage unit (not shown) of the projector as in the first embodiment. The program storage unit constitutes a medium which stores the image processing program. Further, the image processing program itself is also included in the scope of the present invention.

First, when the use of the projector 20 is started, XYZ values of reflected light of an external illumination reflected from the screen 10 are measured by the optical sensor 170 (step 302).

Next, the color correction table selector 180 refers to the XYZ values of reflected lights stored in the color correction table storage unit 190, then selects from the color correction table storage unit 190 a corresponding color correction table generated for XYZ values closest to the XYZ values measured by the optical sensor 170 and informs the color corrector 120 of the corresponding color correction table. The color corrector 120 reads out the corresponding color correction table from the color correction table storage unit 190 and makes rewrite into the corresponding color correction table (step 304).

After the color correction table select/rewrite processing, there is made image display with reference to the rewritten color correction table and in accordance with the image signal color-corrected by the color corrector 120 (step 306). In this case, if the image display is not terminated (step 308, No) and if a certain time has not elapsed from the end of the last-time color correction table select/rewrite processing (step 310, No), the state of image display in step 306 continues. On the other hand, if the image display is not terminated (step 308, No) and if a certain time has elapsed from the end of the last-time color correction table select/rewrite processing (step 310, Yes), the XYZ value measurement for external illumination (step 302) and the color correction table select/rewrite processing (step 304) are performed taking into account the case where the color of external illumination changes with the lapse of time, and there is made image display (step 306). According to the present invention, since the color correction table is rewritten at every certain time while taking the change in brightness of external illumination into account, an appropriate color reproduction is ensured even if the color of external illumination changes.

In the case where the image display is terminated, for example by turning OFF a power supply of the projector (step 308, Yes), the processing is ended.

Third Embodiment

Figure 13:
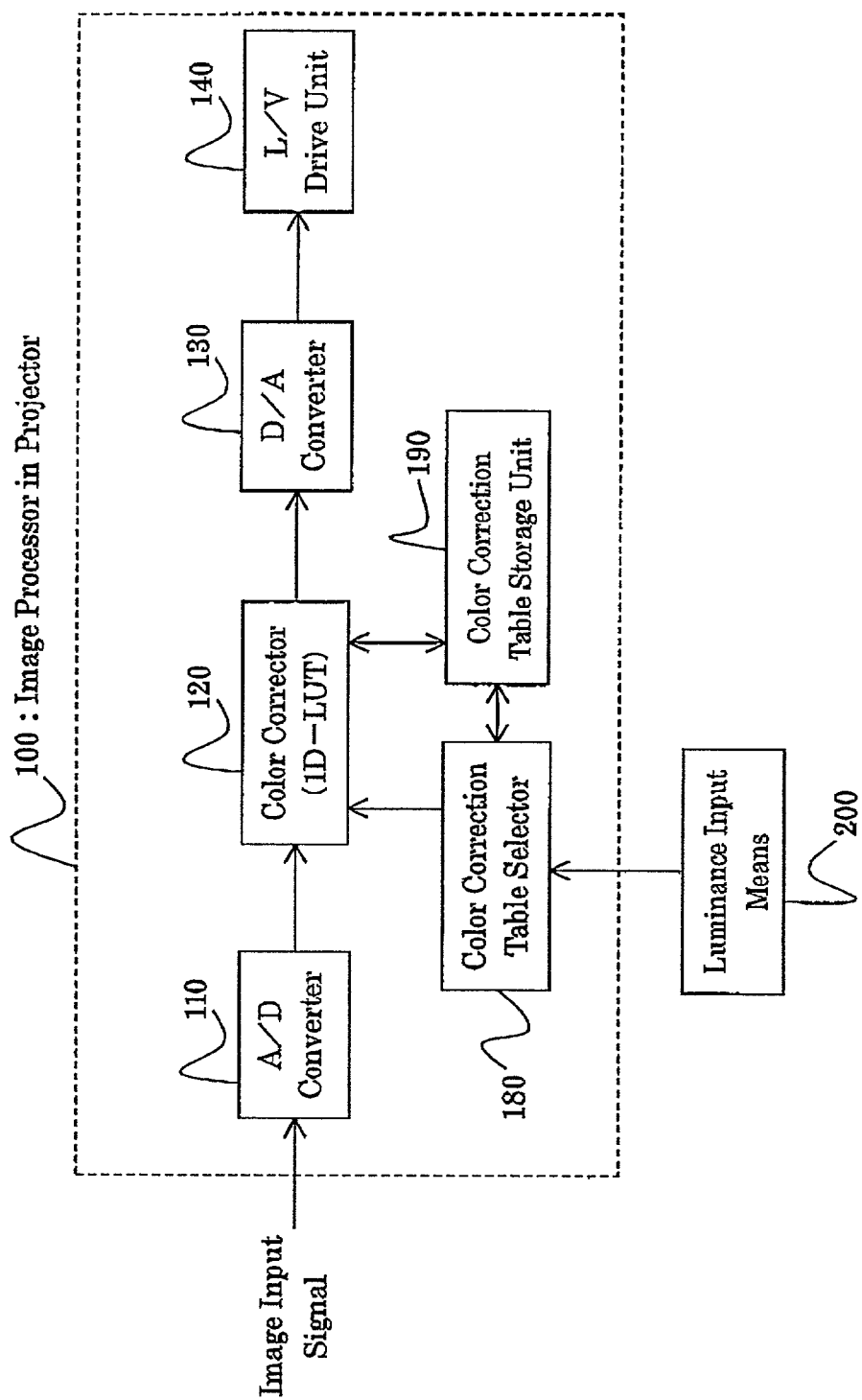
FIG. 13 is a functional block diagram of an image processor 100 used in a projector 20 according to the third embodiment of the present invention.

FIG. 13 is a functional block diagram of an image processor 100 installed in a projector 20 according to the third embodiment of the present invention, in which the same components as in the first and second embodiments are identified by the same reference numerals as in those previous embodiments.

The image processor 100 in the projector of this third embodiment, like the first and second embodiments, is also provided with an A/D converter 110 for converting an analog image input signal to a digital signal, a color corrector 120 for applying a one-dimensional color correction table to RGB image input signals to make a desired color correction, a D/A converter 130 for converting a digital signal to an analog signal, and a L/V (light valve) drive unit 140 for actuating a liquid crystal light valve to make a projection display of image.

The image processor 100 in the projector of this third embodiment is further provided with a color correction table storage unit 190 for the storage of color correction tables generated for plural types of external illuminations and a color correction table selector 180 for selecting a suitable color correction table from among the color correction tables stored in the color correction table storage unit 190.

The image processor 100 in the projector of this third embodiment is different from the image processor used in the second embodiment in that (1) it is further provided with a luminance input means 200 for inputting a luminance value of external illumination and (2) the color correction table selector 180 selects a suitable color correction table from among the color correction tables stored in the color correction table storage unit 190 on the basis of XYZ values inputted from the luminance input means 200.

As to the color correction table generation/storage processing, it is the same as in the second embodiment, so an explanation thereof will here be omitted.

Operation of the Image Processor 100

Figure 14:
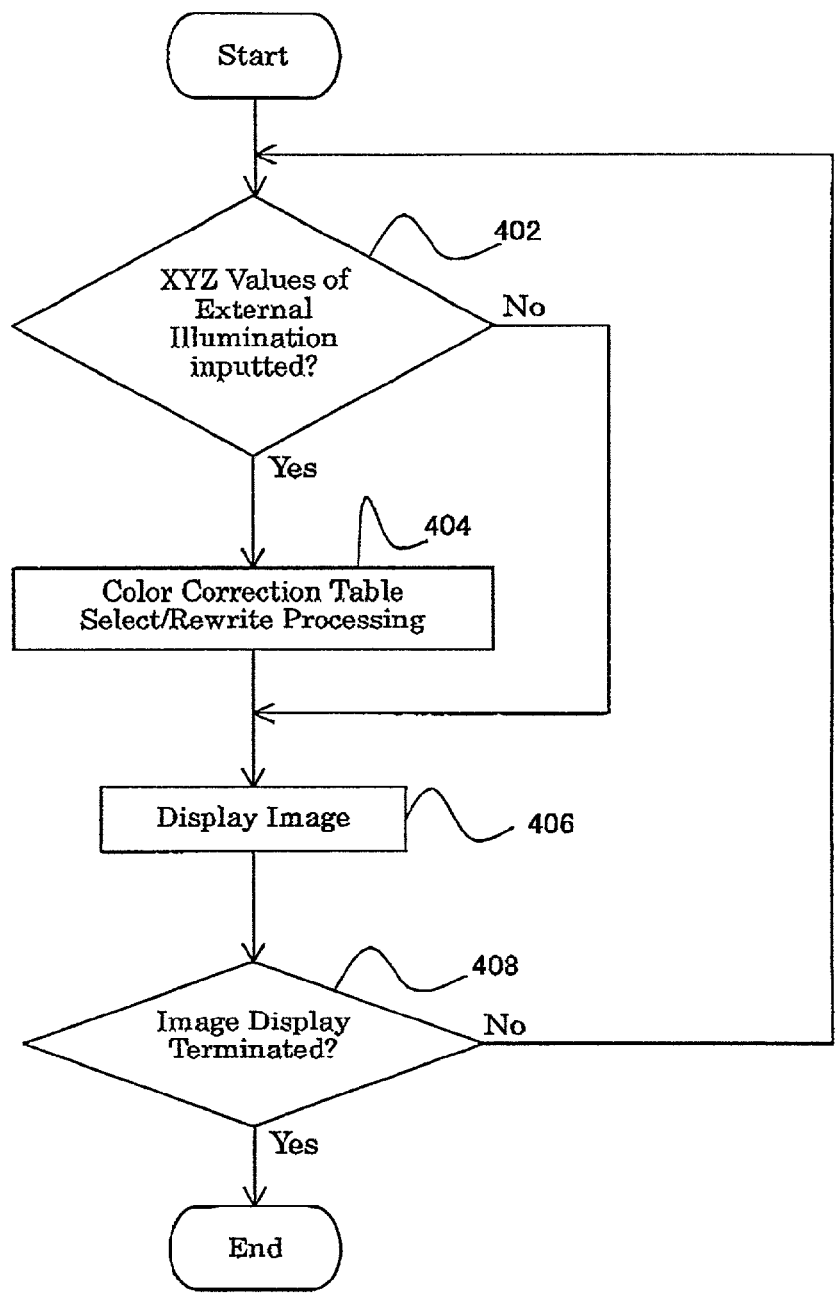
FIG. 14 is a flow chart for explaining the operation of the image processor 100 in the projector 20 of the third embodiment.

Next, with reference to FIG. 14, a description will be given below about the operation of the image processor 100 in the projector 20 of this third embodiment.

The following processing by the image processor 100 is carried out by executing an image processing program stored in a program storage unit (not shown) in the projector 20 as in the first and second embodiments. The program storage unit constitutes a medium which stores the image processing program. The image processing program itself is included in the scope of the present invention.

The operation of the image processor 100 in the projector 20 of this third embodiment is basically the same as in the second embodiment.

In the previous second embodiment, in step 302, XYZ values of reflected light of the exterior illumination from the screen 10 are measured at every certain time by the optical sensor 170 and the color correction table selector 180 selects from the color correction table storage unit 190 a corresponding color correction table generated for XYZ values closest to the measured XYZ values.

This third embodiment is different from such second embodiment in that, in step 402, XYZ values of reflected light of the external illumination from the screen 10 are inputted by the luminance input means 200 and the color correction table selector 180 refers to the XYZ values of reflected lights stored in the color correction table storage unit 190 and selects from the color correction table storage unit 190 a corresponding color correction table generated for XYZ values closest to the inputted XYZ values.

When XYZ values of reflected light of the external illumination from the screen 10 are inputted by the luminance input means 200 (step 402, Yes), the color correction table selector 180 informs the color corrector 120 of a corresponding color correction table. The color corrector 120 reads out the corresponding color correction table from the color correction table storage unit 190 and makes rewrite into the corresponding color correction table (step 404). Then, the display of image is performed with reference to the rewritten color correction table and on the basis of an image signal color-corrected by the color corrector 120 (step 406).

On the other hand, in the case where XYZ values of reflected light of the external illumination from the screen 10 are not inputted by the luminance input means 200 (step 402, No), the display of image is performed without rewrite of the color correction table (step 406).

The above steps 402–406 are repeated until the image display is terminated, for example by turning OFF a power supply of the projector (step 408).

What is claimed is:

1. A method for generating a correction curve for correcting image data inputted to an image display unit, comprising:
    a measuring step of measuring color components ratios of a predetermined external illumination; and
    a correction curve generating step of generating a correction curve which corrects input image data so as to eliminate a difference in the measured color components ratios of the external illumination,
    wherein the difference in color components ratios of the predetermined external illumination is eliminated by offsetting said difference.

2. An image processing method for image data inputted to an image display unit, wherein the inputted image data is corrected by using a correction curve which eliminates a difference in color components ratios of a predetermined external illumination, and wherein the difference in color components ratios of the predetermined external illumination is eliminated by offsetting said difference;
    wherein the amount of said offset is determined by subtracting each color component from an average of color components.

3. An image processing method for image data inputted to an image display unit, wherein the inputted image data is corrected by using a correction curve which eliminates a difference in color components ratios of a predetermined external illumination, and wherein the difference in color components ratios of the predetermined external illumination is eliminated by offsetting said difference;
    wherein the correction curve is subjected to a rounding process.

4. The image processing method according to claim 3, wherein the degree of said rounding process is adjustable.

5. An image display unit for performing an image processing for an inputted image data, wherein the image display unit performs the image processing for the inputted data based on a correction curve, which is sequentially generated by sequentially repeating a method for generating the correction curve comprising:
    a measuring step of measuring color components ratios of a predetermined external illumination; and
    a correction curve generating step of generating a correction curve which corrects input image data so as to eliminate a difference in the measured color components ratios of the external illumination.

6. An image display unit for performing an processing for an inputted image data, wherein the inputted image data is corrected by using a correction curve which eliminates a difference in color components ratios of a predetermined external illumination, and wherein the difference in color components ratios of the predetermined external illumination is eliminated by offsetting said difference;
    wherein the amount of said offset is determined by subtracting each color component from an average of color components.

7. An image display unit for performing an processing for an inputted image data, wherein the inputted image data is corrected by using a correction curve which eliminates a difference in color components ratios of a predetermined external illumination, and wherein the difference in color components ratios of the predetermined external illumination is eliminated by offsetting said difference;
    wherein the correction curve is subjected to a rounding process.

8. The image display unit according to claim 7, wherein the degree of said rounding process is adjustable.

9. A computer-readable medium having a program of instructions for execution by the computer to perform an image processing for image data inputted to an image display unit, wherein the inputted image data is corrected by using a correction curve which eliminates a difference in color components ratios of a predetermined external illumination, and wherein the difference in color components ratios of the predetermined external illumination is eliminated by offsetting said difference;

wherein the amount of said offset is determined by subtracting each color component from an average of color components.

10. A computer-readable medium having a program of instructions for execution by the computer to perform an image processing for image data inputted to an image display unit, wherein the inputted image data is corrected by using a correction curve which eliminates a difference in color components ratios of a predetermined external illumination, and wherein the difference in color components ratios of the predetermined external illumination is eliminated by offsetting said difference;

wherein the correction curve is subjected to a rounding process.

11. The computer-readable medium according to claim 10, wherein the degree of said rounding process is adjustable.

12. A method of processing image data input to an image display unit, said method comprising the steps of:

obtaining values of color components of an external illumination;

based on the obtained values of all of the color components, providing a correction curve which at least partially offsets differences between the obtained values of the color components; and correcting the input image data using the provided correction curve;

wherein, in the providing step, an offsetting amount for each of the color components is determined by subtracting from the obtained value of said color component an average value of the obtained values of all of the color components.

13. A method of processing image data input to an image display unit, said method comprising the steps of:

obtaining values of color components of an external illumination;

based on the obtained values of all of the color components, providing a correction curve which at least partially offsets differences between the obtained values of the color components; and correcting the input image data using the provided correction curve;

wherein, in the providing step, the correction curve is subjected to a rounding process.

* * * * *